April 10, 1945.    W. T. HANKE    2,373,470
ANTISIPHONING PLUG
Filed Aug. 19, 1944

INVENTOR.
William T. Hanke
BY
Louis Chayka
Attorney

Patented Apr. 10, 1945

2,373,470

UNITED STATES PATENT OFFICE 2,373,470

ANTISIPHONING PLUG

William T. Hanke, Detroit, Mich.

Application August 19, 1944, Serial No. 550,274

2 Claims. (Cl. 70—168)

The plug of my invention is designed to be used for storage tanks for gasoline and the like, as a means of preventing unauthorized siphoning of the contents of the tank.

The purpose of my invention is to provide a simple but effective device which would prevent such unauthorized siphoning.

I shall now describe my said plug with reference to the accompanying drawing, in which.

Similar numerals refer to similar parts throughout the several views.

Generally, the plug is a substantially cylindrical body which fits into the inlet pipe of a storage tank and is supported therein by a cross-bar. In order that it may not be removed by unauthorized persons, it contains a lock with a radial bolt fitting into a suitable recess in said inlet pipe. A key is needed to unlock and to remove the plug from the pipe. As the diameter of the plug is but slightly smaller than the inside diameter of said inlet pipe, there is no room for any tubes needed for siphoning. In case the opening is to be cleared for admission of more gasoline, the plug is easily removed.

Figure 3:
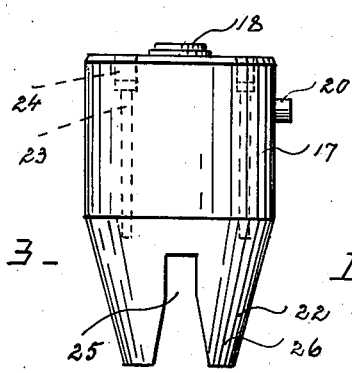
Fig. 3 is a side elevation of my plug, considerably enlarged.
Figure 4:
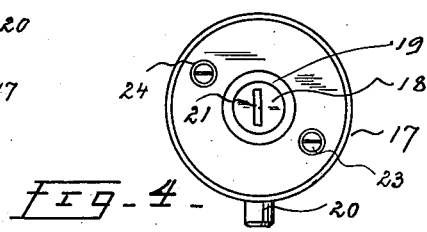
Fig. 4 is a plan view of the plug shown in Fig. 3.

I shall now describe the plug in detail: As best shown in Fig. 3, it consists of two parts, a barrel-like member 17 hollowed on the inside for the accommodation of a lock, which is not shown, and a lower tapered member 22. The lock includes a cylinder 18 within a socket 19 in top surface of member 17. Numeral 21 indicates a key-hole for insertion of a key. Numeral 20 indicates a bolt radially shiftable within said member 17. The lower part of the plug, namely, part 22, is solid and divided into two legs 26, spaced apart by means of a diametrical slot 25 flaring out in the direction of the lower end of said member. The two members 17 and 22 are held together by means of screws 23. Recesses 24 in said member 17 provide space for insertion of said screws.

Figure 6:
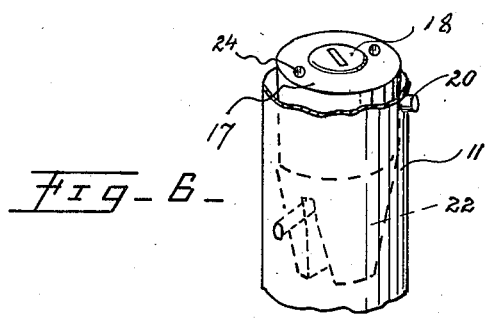
Fig. 6 is a perspective view of my plug as seated in the pipe, which is shown broken off.
Figure 5:
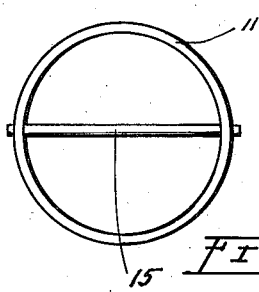
Fig. 5 is a top view of the inlet pipe with a cross-bar therein.

As indicated above, the plug is to be let into a pipe where it rests on a cross-bar 15, as shown in the drawing, said bar fitting into slot 25 between legs 26. The cross-bar serves a purpose of aligning the plug and the bolt 20 with openings 16 in the side of the pipe into which said bolt may be made to project. The actual arrangement of the plug within the pipe is best shown in Fig. 6.

I wish to add that to prevent leakage of gasoline through said openings 16, when the tank is being filled up, the inlet pipe ought to be set in concrete or some other comparatively non-absorbing substance. The provision, I must point out, is merely suggestive and forms no part of my invention.

Figure 1:
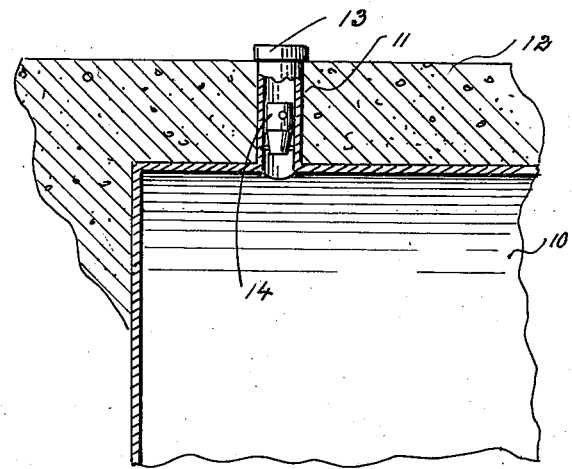
Fig. 1 is a fragmentary sectional view of a storage tank, under ground, with my plug in the inlet pipe of said tank.
Figure 2:
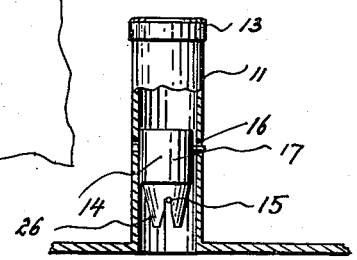
Fig. 2 is an enlarged sectional view of the inlet pipe with my plug installed therein.

The installation of the plug with reference to the tank is shown in Fig. 1, wherein numeral 10 indicates the tank. Numeral 11 shows the inlet pipe having thereon a cap 13. Numeral 12 indicates the ground in which the tank is located. The plug is indicated by numeral 14.

It will be understood that the pipe into which the plug is to go in, is provided with two diametrically, opposed openings 16 for the reception of the bolt 20. Said holes are at a definite height above the cross-bar 15 and in a definite directional relation with reference to said cross-bar. The relation of said cross-bar 15 to holes 16 is such that when the plug is dropped into the inlet pipe so that legs 26 straddle cross-bar 15, one of said holes 16 is directly opposite said bolt 20. All that is needed then to secure the bolt in place is to shift the bolt radially by means of a key so that it projects into the respective hole.

The nature of the plug, its possibilities and its application will be well understood from the above description. I may add, however, a few details which I found advantageous and desirable. I find that it is best to have the cross-bar 15 located at some distance below the top of the inlet pipe, so that the top of my plug is well within said inlet pipe. This makes the plug more difficult of access so that unauthorized persons may not try it to fit keys into the lock within my plug operating said bolt 20. Obviously, when the plug is located some distance from the top of the inlet pipe, the key may be mounted on a suitable rod.

I also found that the best lock is one which requires a quarter turn in order to operate said bolt. This arrangement helps to remove the plug when the key is in. By a quarter turn of the key, the bolt 20 is withdrawn and whereupon the key itself serves as a means of lifting the plug without allowing the plug to slip off said key.

Although the cross-bar is one means of supporting the plug, there may be some other arrangement made for that purpose like, for instance, a long pipe axially seated within the lower part of the plug, the outer end of the pipe resting on the bottom of the tank.

Other changes may be made in the construction of my plug and the means supporting it without deviating from the inventive principle disclosed therein. What I, therefore, wish to claim is as follows:

1. In combination, an inlet pipe for storage tanks, the pipe being provided with two diametrically opposed holes in its wall and a crossbar below the level of said holes, and an anti-siphoning plug, the latter comprising a cylindrical member axially disposed within the inlet pipe and substantially filling it laterally, a lock within said cylindrical member, including a bolt shiftable radially into one of said holes, and a bottom member having two spaced legs to straddle the crossbar in the inlet pipe.

2. In combination with a vertical inlet pipe for storage tanks for gasoline and the like, wherein said pipe is provided with two diametrically opposed recesses in its wall and a cross-bar diametrically disposed therein below the level of said holes, an anti-siphoning plug including a cylindrical hollow head axially seated within the pipe and substantially filling it laterally, a lock within said head, having a key slot for insertion of a key to operate the lock, in the upper surface of the head, and a bolt radially shiftable by means of said key into one of said recesses, and a lower member tapering downwardly, and split by a diametrical slot to form two legs to straddle said crossbar serving as a support for the plug.

WILLIAM T. HANKE.